(12) United States Patent
Maeda et al.

(10) Patent No.: US 11,077,835 B2
(45) Date of Patent: Aug. 3, 2021

(54) CONTROL APPARATUS FOR VEHICLE AND CONTROL METHOD FOR VEHICLE

(71) Applicant: SUBARU CORPORATION, Tokyo (JP)

(72) Inventors: Yuya Maeda, Tokyo (JP); Noeru Sato, Tokyo (JP); Fumiya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 55 days.

(21) Appl. No.: 16/241,001

(22) Filed: Jan. 7, 2019

(65) Prior Publication Data

US 2019/0299948 A1    Oct. 3, 2019

(30) Foreign Application Priority Data

Mar. 28, 2018    (JP) .............................. JP2018-062729

(51) Int. Cl.
*B60W 40/068* (2012.01)
*B60T 8/1763* (2006.01)
*B60T 8/171* (2006.01)

(52) U.S. Cl.
CPC ............ *B60T 8/1763* (2013.01); *B60T 8/171* (2013.01); *B60W 40/068* (2013.01)

(58) Field of Classification Search
CPC ........ B60T 8/1763; B60T 8/171; B60T 8/172; B60T 2210/12; B60W 40/068; B60W 50/0098; B60W 2420/42; B60W 2520/28; B60W 2050/0075
See application file for complete search history.

(56) References Cited

U.S. PATENT DOCUMENTS

| 4,712,635 A * | 12/1987 | Moroto et al. .......... B60T 8/322 180/197 |
| 2005/0222740 A1 | 10/2005 | Inoue et al. |
| 2008/0129541 A1* | 6/2008 | Lu ...................... G06K 9/00791 340/905 |

(Continued)

FOREIGN PATENT DOCUMENTS

| JP | H04-331336 A | 11/1992 |
| JP | 2001041741 A * | 2/2001 |

(Continued)

OTHER PUBLICATIONS

Japanese Office Action for Application No. 2018-062729 dated Jul. 30, 2019.

(Continued)

*Primary Examiner* — Hunter B Lonsberry
*Assistant Examiner* — Daniel M. Robert
(74) *Attorney, Agent, or Firm* — Troutman Pepper Hamilton Sanders LLP

(57) ABSTRACT

A control apparatus for a vehicle includes: a first road surface friction coefficient calculator; a second road surface friction coefficient calculator; and a braking and driving force controller. The first road surface friction coefficient calculator calculates a first road surface friction coefficient that is a friction coefficient of a road surface in a contact with a wheel. The second road surface friction coefficient calculator calculates a second road surface friction coefficient on a basis of a detection value from a contactless sensor that contactlessly detects a road surface state.

17 Claims, 12 Drawing Sheets

(56) References Cited

U.S. PATENT DOCUMENTS

2011/0209521 A1* 9/2011 Shiozawa ........... B60L 15/2036
73/9
2016/0176408 A1* 6/2016 Lynch ................. B60W 40/068
701/23

FOREIGN PATENT DOCUMENTS

| JP | 2006-46936 A | 2/2006 |
| JP | 4277799 B2 | 6/2009 |
| JP | 2011-1003 A | 1/2011 |
| JP | 2011-230543 A | 11/2011 |
| JP | 2011230543 A * | 11/2011 |

OTHER PUBLICATIONS

Friction coefficient tables of Corp. Nihon Kotsu Jiko Kanshiki Kenkyujo (http://weekend.nikkouken.com/week47/409/) retrieved on Jul. 3, 2017.

* cited by examiner

FIG. 4

| ROAD SURFACE CONDITION | | DRY | | WET | |
|---|---|---|---|---|---|
| | VELOCITY km/h | 50km/h OR LOWER | 50km/h OR HIGHER | 50km/h OR LOWER | 50km/h OR HIGHER |
| ASPHALT | NEW PAVEMENT | 0.8 TO 1.0 | 0.65 TO 0.7 | 0.5 TO 0.8 | 0.45 TO 0.75 |
| | NORMAL PAVEMENT | 0.6 TO 0.8 | 0.55 TO 0.7 | 0.45 TO 0.7 | 0.4 TO 0.65 |
| | WORN PAVEMENT | 0.55 TO 0.75 | 0.45 TO 0.65 | 0.45 TO 0.65 | 0.4 TO 0.6 |
| | EXCESSIVE TAR | 0.5 TO 0.6 | 0.35 TO 0.6 | 0.3 TO 0.6 | 0.25 TO 0.55 |
| CONCRETE | NEW PAVEMENT | 0.8 TO 1.0 | 0.7 TO 0.85 | 0.5 TO 0.8 | 0.4 TO 0.75 |
| | NORMAL PAVEMENT | 0.6 TO 0.8 | 0.6 TO 0.75 | 0.45 TO 0.7 | 0.45 TO 0.65 |
| | WORN PAVEMENT | 0.55 TO 0.75 | 0.5 TO 0.65 | 0.45 TO 0.65 | 0.45 TO 0.6 |
| GRAVEL | SIMPLIFIED PAVEMENT | 0.55 TO 0.85 | 0.5 TO 0.8 | 0.4 TO 0.8 | 0.4 TO 0.6 |
| | FINE GRAVEL | 0.44 TO 0.7 | 0.4 TO 0.7 | 0.45 TO 0.75 | 0.45 TO 0.75 |
| ICE | SMOOTH SURFACE | 0.1 TO 0.25 | 0.07 TO 0.2 | 0.05 TO 0.1 | 0 TO 0.1 |
| | HARD | 0.3 TO 0.55 | 0 TO 0.35 | 0.3 TO 0.6 | 0 TO 0.6 |
| SNOW | FRESH SNOW | 0.1 TO 0.25 | 0.1 TO 0.2 | 0.3 TO 0.6 | 0 TO 0.6 |
| | COMPRESSED | 0.3 TO 0.55 | 0.35 TO 0.55 | 0.3 TO 0.6 | 0.3 TO 0.6 |

FIG. 10
WHEN NORMALLY TRAVELING
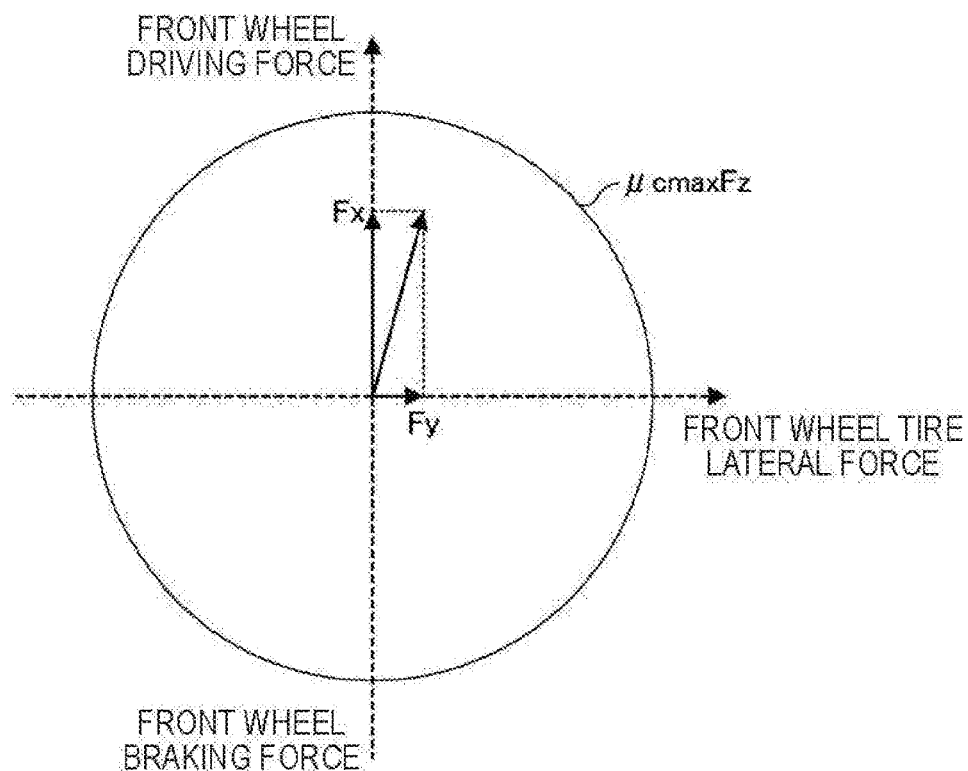
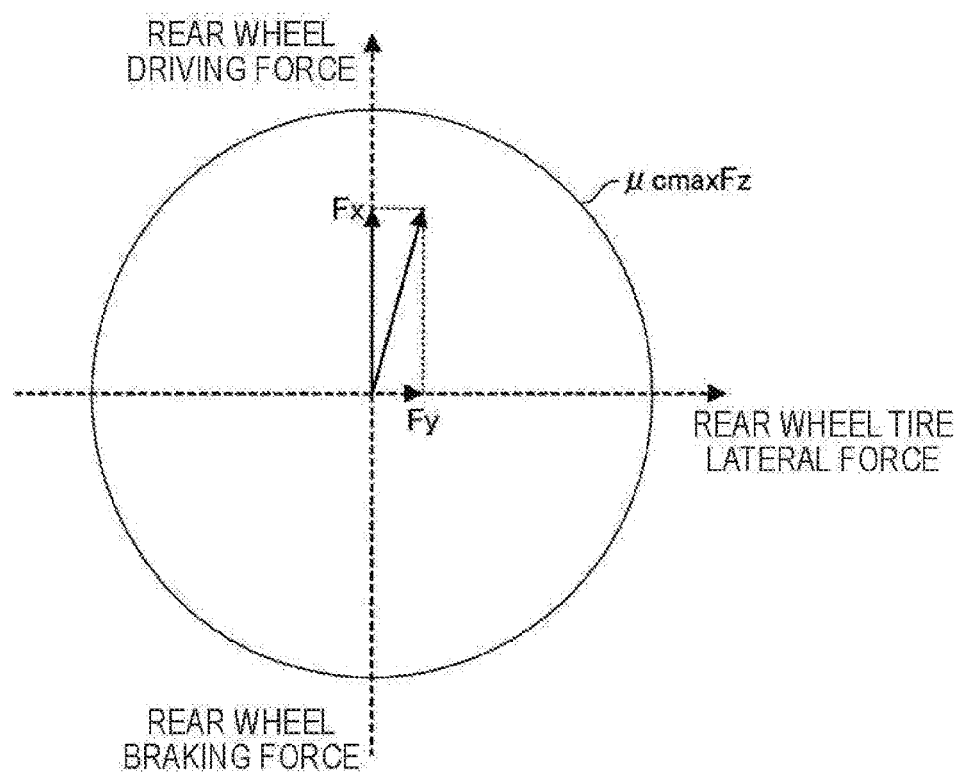

CONTROL APPARATUS FOR VEHICLE AND CONTROL METHOD FOR VEHICLE

CROSS-REFERENCE TO RELATED APPLICATIONS

The present application claims priority from Japanese Patent Application No. 2018-062729 filed on Mar. 28, 2018, the entire contents of which are hereby incorporated by reference.

BACKGROUND

1. Technical Field

The present invention relates to a control apparatus for a vehicle and a control method for a vehicle.

2. Related Art

Conventionally, for instance, Japanese Unexamined Patent Application Publication (JP-A) No. 2011-1003 has described that a front-back driving force distribution control mechanism and a braking force control mechanism are appropriately controlled to make the most of the tire force of all the four front, rear, left, and right wheels and improve the limit performance while maintaining the vehicle stability near the tire limit.

SUMMARY OF THE INVENTION

An aspect of the present invention provides a control apparatus for a vehicle. The control apparatus includes: a first road surface friction coefficient calculator configured to calculate a first road surface friction coefficient that is a friction coefficient of a road surface in a contact with a wheel; a second road surface friction coefficient calculator configured to calculate a second road surface friction coefficient on a basis of a detection value from a contactless sensor capable of contactlessly detecting a road surface state; and a braking and driving force controller configured to control a braking and driving force of the vehicle on a basis of the first road surface friction coefficient at a normal time, and control the braking and driving force of the vehicle on a basis of the second road surface friction coefficient in a case where it is determined on the basis of the second road surface friction coefficient that a low friction road surface having a low friction coefficient is present in front of the vehicle.

Another aspect of the present invention provides a control method for a vehicle. The control method includes: calculating a first road surface friction coefficient that is a friction coefficient of a road surface in a contact with a wheel; calculating a second road surface friction coefficient on a basis of a detection value from a contactless sensor capable of contactlessly detecting a road surface state; and controlling a braking and driving force of the vehicle on a basis of the first road surface friction coefficient at a normal time, and controlling the braking and driving force of the vehicle on a basis of the second road surface friction coefficient in a case where it is determined on the basis of the second road surface friction coefficient that a low friction road surface having a low friction coefficient is present in front of the vehicle.

Another aspect of the present invention provides a control apparatus for a vehicle. The control apparatus includes circuitry configured to calculate a first road surface friction coefficient that is a friction coefficient of a road surface in a contact with a wheel, calculate a second road surface friction coefficient on a basis of a detection value from a contactless sensor capable of contactlessly detecting a road surface state, and control a braking and driving force of the vehicle on a basis of the first road surface friction coefficient at a normal time, and control the braking and driving force of the vehicle on a basis of the second road surface friction coefficient in a case where it is determined on the basis of the second road surface friction coefficient that a low friction road surface having a low friction coefficient is present in front of the vehicle.

BRIEF DESCRIPTION OF THE DRAWINGS

FIG. 4 is a schematic diagram illustrating an instance of a database that defines in advance a relationship between a road surface state and a friction coefficient;

FIG. 10 is a schematic diagram illustrating that, when normally traveling, braking and driving force control is performed on resultant force of Fx and Fy with respect to each of a front wheel and a rear wheel within a range of a friction circle ($\mu$cmaxFz)

DETAILED DESCRIPTION

Figure 1:
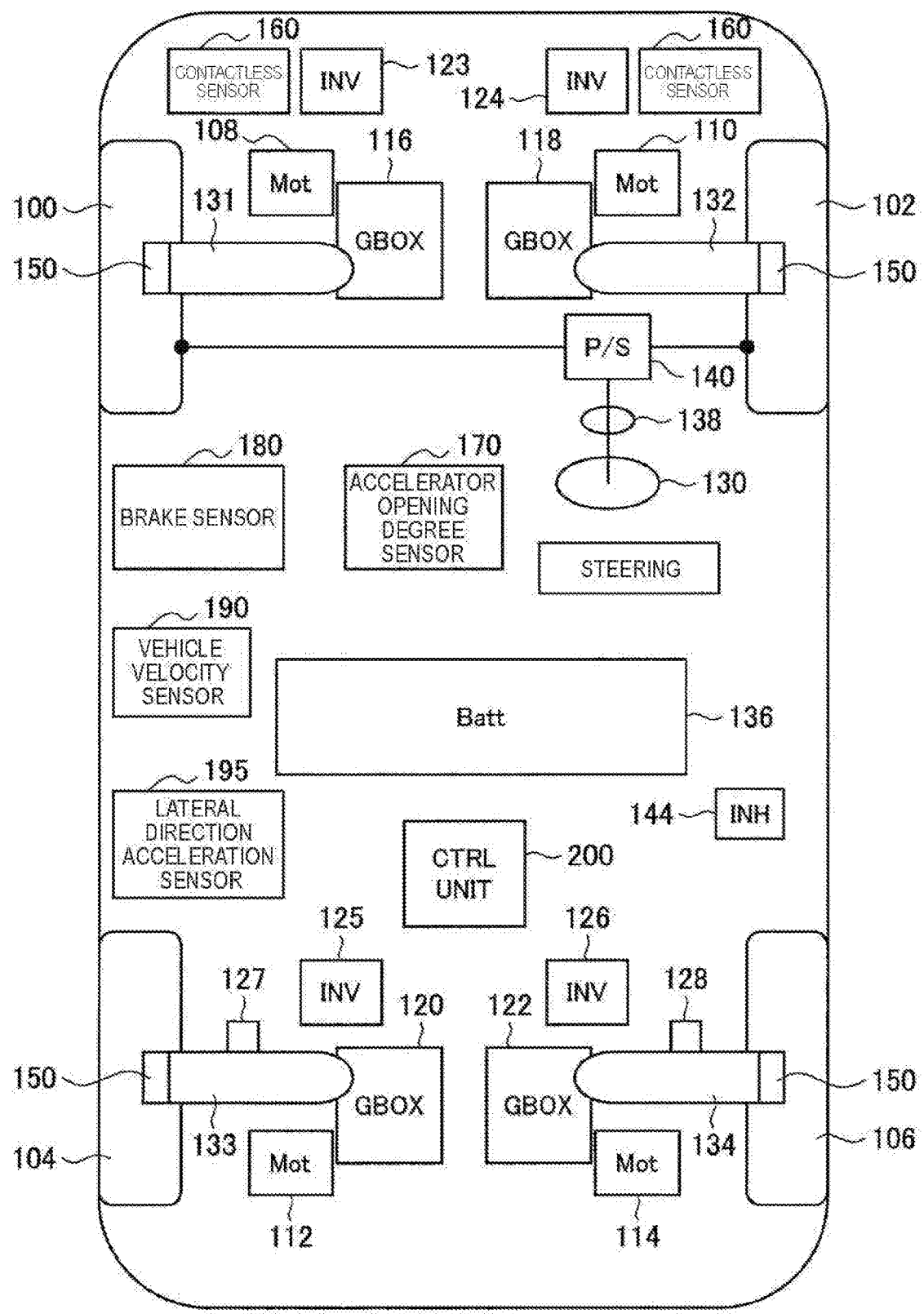
FIG. 1 is a schematic diagram illustrating a configuration of a vehicle according to an example of the present invention.

Hereinafter, preferred examples of the present invention will be described in detail with reference to the appended drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout this specification and the appended drawings, structural elements that have substantially the same function and structure are denoted with the same reference numerals, and repeated description of these structural elements is omitted.

To control the braking and driving force of a vehicle by making the most of the tire force, it is desirable to perform control based on a friction coefficient. Meanwhile, accurately estimating the friction coefficient entails certain difficulty. Further, in the case where the road surface on which the vehicle is currently traveling has high μ and a road surface of low μ is present in front of the vehicle even though the friction coefficient can be accurately estimated, the vehicle can suddenly dash into a low μ road and make the vehicle behavior unstable.

It is desirable to provide a novel and improved control apparatus for a vehicle and a novel and improved control method for a vehicle which can optimally control the vehicle on the basis of the road surface on which the vehicle is traveling and the friction coefficient of the road surface in front of the vehicle.

First, with reference to FIG. 1, the configuration of a vehicle 2000 according to an example of the present invention will be described. FIG. 1 is a schematic diagram illustrating the vehicle 2000 according to the present example. As illustrated in FIG. 1, the vehicle 2000 includes front wheels 100 and 102, rear wheels 104 and 106, driving force generation apparatuses (motors) 108, 110, 112, and 114 that respectively drive the front wheels 100 and 102 and the rear wheels 104 and 106, gear boxes 116, 118, 120, and 122, and drive shafts 131, 132, 133, and 134 that respectively transmit the driving force of the motors 108, 110, 112, and 114 to the front wheels 100 and 102 and the rear wheels 104 and 106, inverters 123, 124, 125, and 126 that respectively control the motors 108, 110, 112, and 114, wheel speed sensors 127 and 128 that respectively detect the wheel speed (vehicle velocity V) of the rear wheels 104 and 106, a steering wheel 130 for steering the front wheels 100 and 102, a steering angle sensor 138, and a power steering mechanism 140.

In addition, the vehicle 2000 includes a first sensor 150 (hub unit sensor) and a second sensor 160 (contactless sensor) for acquiring a road surface friction coefficient, an accelerator opening degree sensor 170, a brake sensor 180, a vehicle velocity sensor 190, a lateral direction acceleration sensor 195, and a control apparatus (controller) 200.

The vehicle 2000 according to the present example includes the motors 108, 110, 112, and 114 for driving the front wheels 100 and 102 and the rear wheels 104 and 106, respectively. Therefore, it is possible to control driving torque in each of the front wheels 100 and 102 and the rear wheels 104 and 106. Thus, independently from the yaw rate generation by steering the front wheels 100 and 102, the front wheels 100 and 102 and the rear wheels 104 and 106 are each driven to make it possible to generate a yaw rate in accordance with torque vectoring control, and this also makes it possible to assist in steering the steering.

The driving of the respective motors 108, 110, 112, and 114 is controlled by controlling the inverters 123, 124, 125, and 126 respectively corresponding to the motors 108, 110, 112, and 114 on the basis of commands of the control apparatus 200. The driving force of the respective motors 108, 110, 112, and 114 are respectively transmitted to the front wheels 100 and 102 and the rear wheels 104 and 106 via the respective gear boxes 116, 118, 120, and 122 and drive shafts 131, 132, 133, and 134.

The power steering mechanism 140 uses torque control or angle control in accordance with the steering wheel 130 operated by a driver to control the steering angle of the front wheels 100 and 102. The steering angle sensor 138 detects a steering wheel angle θh input by a driver operating the steering wheel 130.

Note that the present example is not limited to this mode, but a vehicle in which the rear wheels 104 and 106 alone independently generate driving force may also be adopted.

Figure 2:
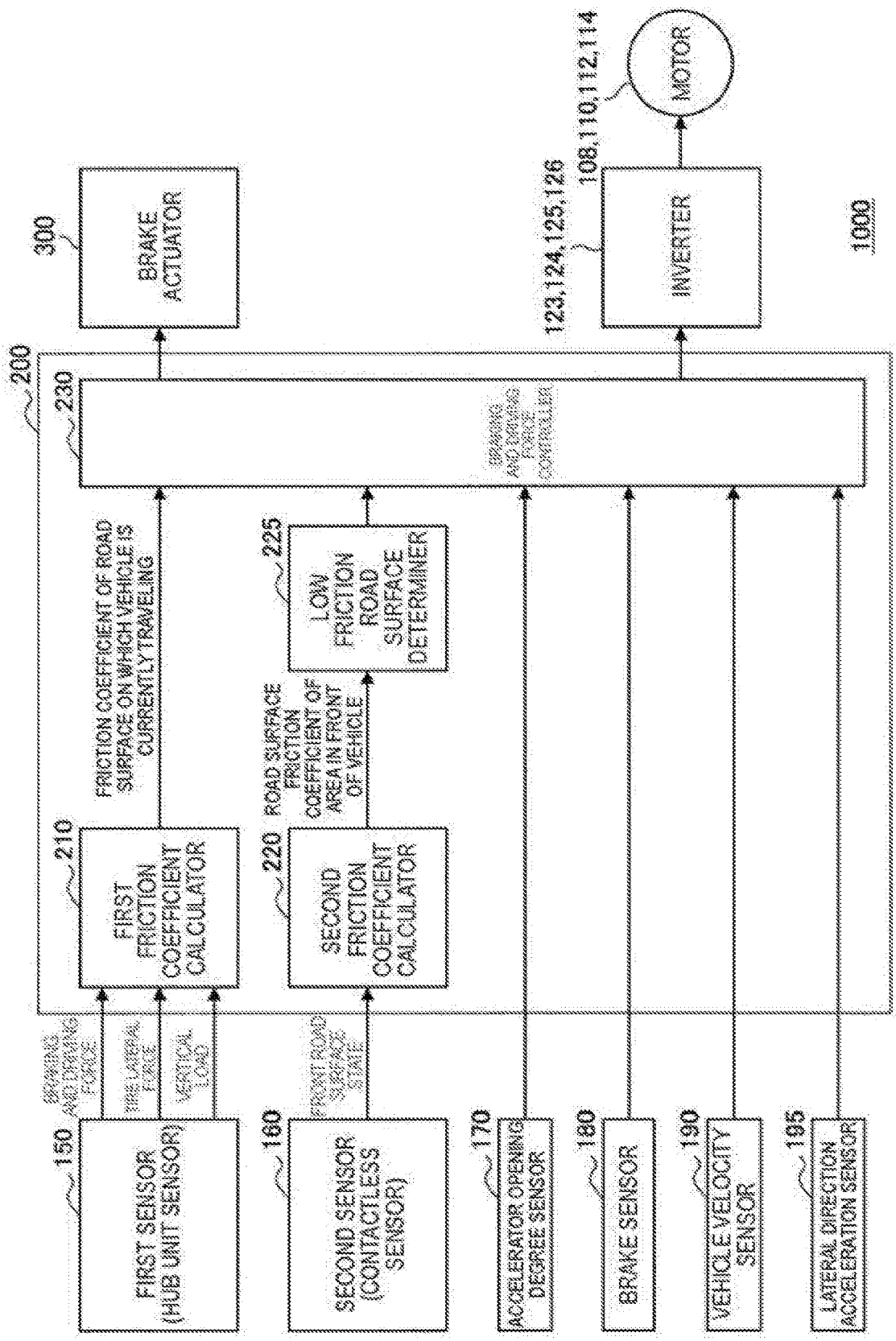
FIG. 2 is a schematic diagram for describing a configuration of a vehicle system according to the example of the present invention.

Next, with reference to FIG. 2, the configuration of a vehicle system 1000 according to the example of the present invention will be described. This vehicle system 1000 is installed in the vehicle 2000. As illustrated in FIG. 2, the vehicle system 1000 according to the present example includes the first sensor 150, the second sensor 160, the accelerator opening degree sensor 170, the brake sensor 180, the vehicle velocity sensor 190, the lateral direction acceleration sensor 195, the control apparatus 200, a brake actuator 300, the inverters 123, 124, 125 and 126, and the motors 108, 110, 112 and 114.

The control apparatus 200 controls the entire vehicle system 1000. The control apparatus 200 includes a first road surface friction coefficient calculator 210, a second road surface friction coefficient calculator 220, a low friction road surface determiner 225, and a braking and driving force controller 230. A component of the control apparatus 200 illustrated in FIG. 2 can include a circuit (hardware) or a central processing unit such as a CPU, and a program (software) for bringing it into operation.

The first sensor 150 and the second sensor 160 detect a variety of parameters for acquiring a road surface friction coefficient. The first sensor 150 includes a hub unit sensor provided to the hub of a wheel, and detects acting force that acts on the front wheels 100 and 102 and the rear wheels 104 and 106. The acting force detected by the first sensor 150 has three-direction force components including the front-back direction force Fx, the lateral force Fy and the normal force Fz, and torque Ty around the shaft of a hub (axle). The front-back direction force Fx is a force component generated in the direction (x-axial direction or front-back direction) parallel to the wheel central plane in frictional force generated in the contact area between the front wheels 100 and 102 and the rear wheels 104 and 106, and the lateral force Fy is a force component generated in the direction (y-axial direction or lateral direction) at right angles to the wheel central plane. Note that the wheel central plane is taken to be a plane which is orthogonal to the axle, and passes through the center of the wheel width. Meanwhile, the normal force Fz is force that acts on the perpendicular direction (z axis) or a so-called vertical load. The torque Ty is torque (torsional force) around the axle of a tire 800.

For instance, the first sensor 150 chiefly includes a strain gauge, and a signal processing circuit that processes an electrical signal output from this strain gauge and generates a detection signal corresponding to acting force. On the basis of the knowledge that stress generated in a hub is proportionate to acting force, the strain gauge is embedded in the hub to directly detect acting force. Note that, as the specific configuration of the first sensor 150, for instance, the configurations described in JP-A H04-331336, JP-A H10-318862, Japanese Patent No. 4277799, and the like can be adopted. The first sensors 150 may also be provided to the drive shafts 131, 132, 133, and 134.

When the first sensor 150 detects three-direction force components including the front-back direction force Fx, the lateral force Fy and the normal force Fz, the first friction coefficient calculator 210 of the control apparatus 200 calculates the friction coefficient of a road surface in real time on the basis of these. A road surface friction coefficient μc can be calculated from the following expression. $\mu c=\sqrt{(Fx^2+Fy^2)}/Fz$ Note that the above demonstrates an instance in which the road surface friction coefficient μc of the road surface in contact with a wheel is calculated on the basis of a detection value of the first sensor 150, but, for instance, the friction coefficient of the road surface in contact with a wheel may be obtained from a sensor or an accelerometer provided inside the tire.

The first friction coefficient calculator 210 calculates the road surface friction coefficient μc and braking and driving force control based on a friction circle of a tire is performed to make it possible to stabilize the vehicle behavior. Meanwhile, the road surface friction coefficient μc calculated by the first friction coefficient calculator 210 is measured after a tire actually lands on a road surface whose road surface friction coefficient is to be measured, and is the friction coefficient of the road surface on which the vehicle is currently traveling. Therefore, if braking and driving force control is performed on the basis of the road surface friction coefficient μc, the vector of the resultant force of Fx and Fy can stick out from the radius of a tire friction circle (μFz) of a low μ road and a slip can be caused before appropriate braking and driving force control is executed, for instance, in the case where the vehicle dashes to an extremely low μ road such as a frozen road from a high μ road.

Therefore, in the present example, separately from the estimation of the road surface friction coefficient μc with the first sensor 150, the second sensor 160 is used to estimate the friction coefficient of a road surface in front of the vehicle which has not yet come into contact with a tire. The second sensor 160 is a hybrid sensor including a contactless sensor such as a camera that images the area in front of the vehicle, a temperature sensor (ambient temperature sensor or road surface temperature sensor), a near-infrared sensor, or a laser light sensor (Time of Flight (TOF) sensor), and detects an image, the temperature, the road surface state, or the like of the area in front of the vehicle. Note that, when the second sensor 160 determines a road surface state, for instance, the method described in JP-A 2006-46936 may be adopted.

When the second sensor 160 detects an image, the temperature, or the like of the area in front of the vehicle, the second friction coefficient calculator 220 of the control apparatus 200 calculates the friction coefficient of the road surface in real time on the basis of these.

Specifically, the second friction coefficient calculator 220 acquires the color of the road surface, the roughness of the road surface, or the like in front of the vehicle from an image of the camera of the second sensor 160. In addition, the second friction coefficient calculator 220 acquires the outside air temperature and the road surface temperature from a contactless thermometer of the second sensor 160.

In addition, the second friction coefficient calculator 220 acquires the amount of water of a road surface from a detection value of the near-infrared sensor of the second sensor 160. The road surface with much water when the road surface is irradiated with a near-infrared ray results in a smaller amount of reflected near-infrared rays, and the road surface with little water results in a larger amount of reflected near-infrared rays. Thus, the second friction coefficient calculator 220 can acquire the amount of water of a road surface on the basis of a detection value of a near-infrared sensor.

In addition, the second friction coefficient calculator 220 acquires the roughness of a road surface from the laser light sensor of the second sensor 160. More specifically, it is possible acquire the roughness (unevenness) of the road surface in front of the vehicle on the basis of the time elapsed from the radiation of laser light to the detection of the reflected light. Note that the second friction coefficient calculator 220 acquires the roughness of the road surface in front of the vehicle by taking into consideration the amount of movement of the road surface accompanied by the vehicle's traveling on the basis of the vehicle velocity.

Figure 3A:
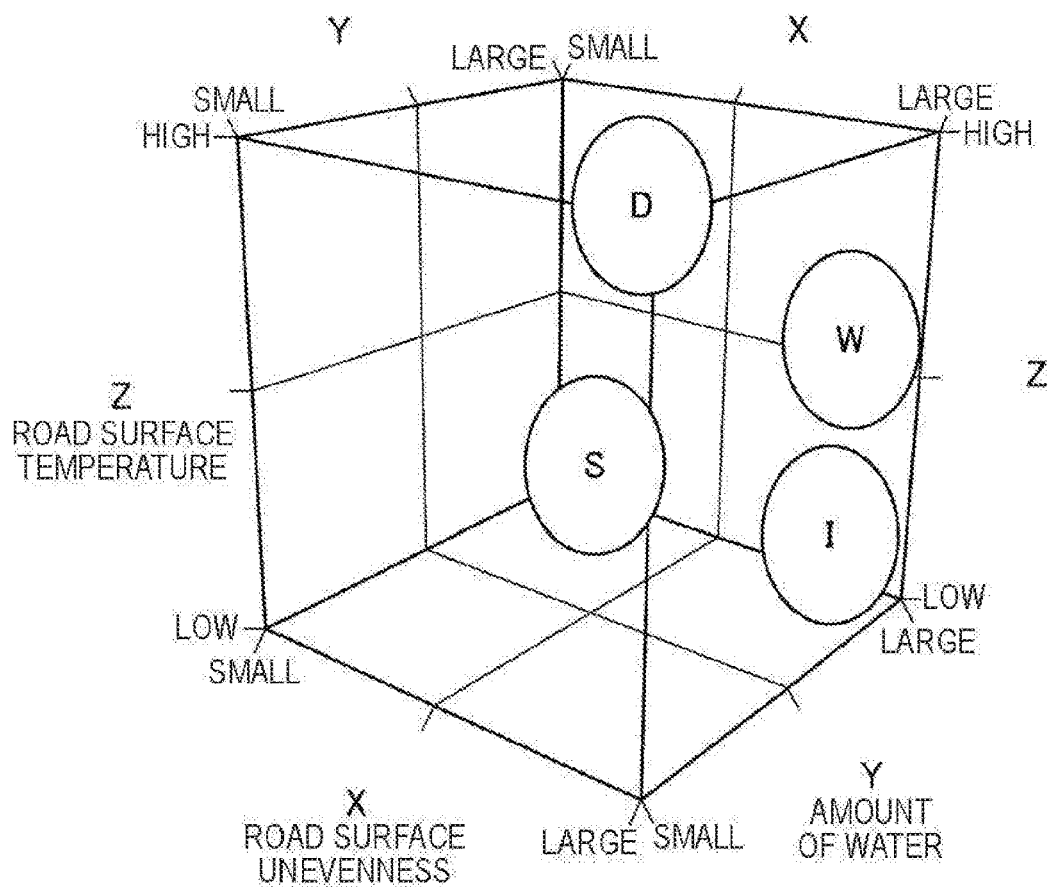
FIG. 3A is a schematic diagram illustrating a map used when a second friction coefficient calculator determines a road surface state.
Figure 3B:
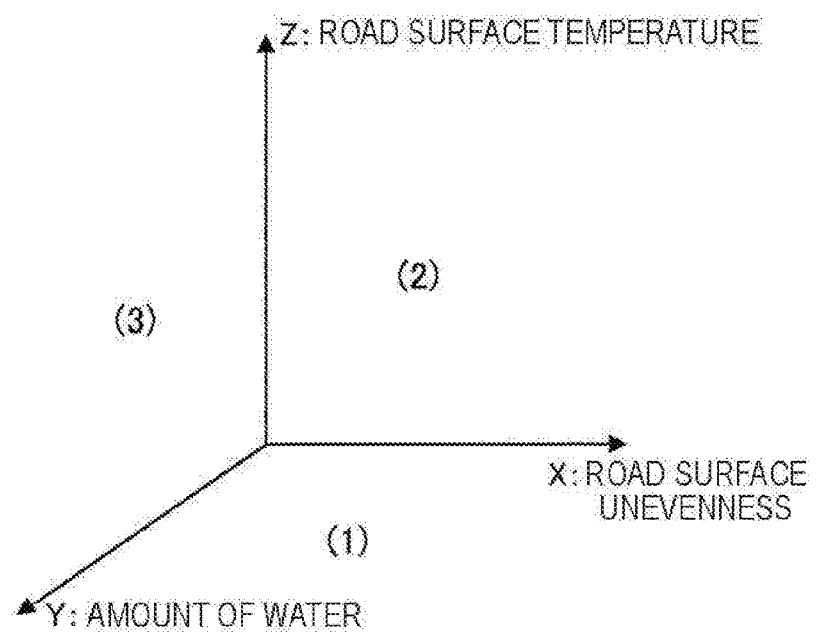
FIG. 3B is a schematic diagram illustrating an exploded view of a three-dimensional map of FIG. 3A as a two-dimensional map.
Figure 3C:
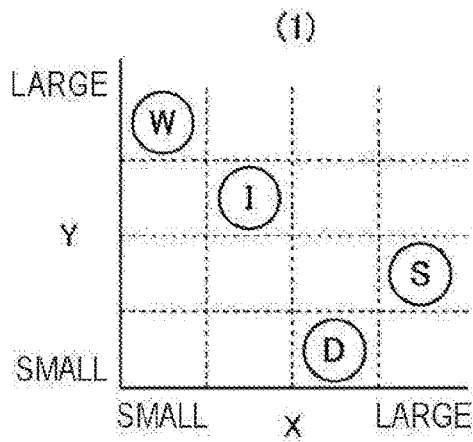
FIG. 3C is a schematic diagram illustrating the exploded view of the three-dimensional map of FIG. 3A as a two-dimensional map.
Figure 3D:
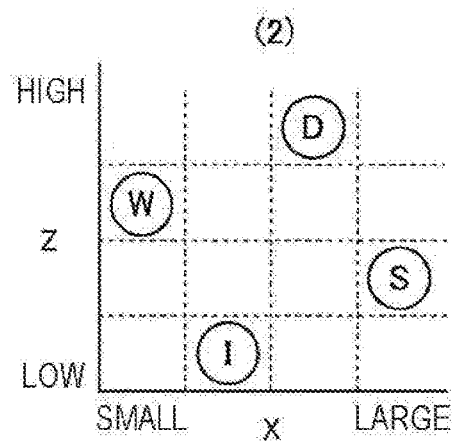
FIG. 3D is a schematic diagram illustrating the exploded view of the three-dimensional map of FIG. 3A as a two-dimensional map.
Figure 3E:
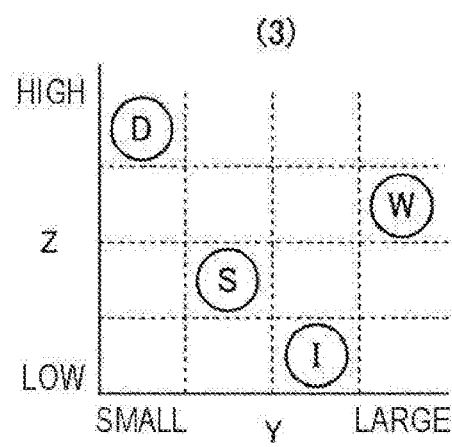
FIG. 3E is a schematic diagram illustrating the exploded view of the three-dimensional map of FIG. 3A as a two-dimensional map.

The second friction coefficient calculator 220 determines from these kinds of information acquired from the second sensor 160 whether the road surface state is dry (D), wet (W), snow (S), or ice (I). FIG. 3A is a schematic diagram illustrating a map used when the second friction coefficient calculator 220 determines a road surface state. The map illustrated in FIG. 3A is a three-dimensional map in which respective values obtained by normalizing road surface temperature, road surface unevenness, and the amount of water of a road surface are used as parameters. FIGS. 3B to 3E are schematic diagrams each illustrating the exploded view of the three-dimensional map of FIG. 3A as a two-dimensional map. FIG. 3B illustrates a coordinate system of road surface temperature (Z axis), road surface unevenness (X axis), and the amount of water (Y axis) of a road surface. FIG. 3C illustrates a two-dimensional map of a (1) plane of FIG. 3B. FIG. 3D illustrates a two-dimensional map of a (2) plane of FIG. 3B. FIG. 3E illustrates a two-dimensional map of a (3) plane of FIG. 3B. The second friction coefficient calculator 220 applies the road surface temperature, the road surface unevenness, and the amount of water of a road surface acquired from detection values of the second sensor 160 to the map of FIG. 3A to determine the road surface state.

Then, the second friction coefficient calculator 220 reflects the road surface state determined from the map of FIG. 3A in a database that defines in advance the relationship between a road surface state and a road surface friction coefficient, thereby calculating a road surface friction coefficient μN. FIG. 4 is a schematic diagram illustrating an instance of a database that defines in advance the relationship between a road surface state and a friction coefficient. As the relationship between a road surface state and a friction coefficient illustrated in FIG. 4, the friction coefficient tables described in the web site (http://weekend.nikkouken.com/week47/409/) of Corp. Nihon Kotsu Jiko Kanshiki Kenkyujo can be used. In the database illustrated in FIG. 4, the friction coefficients corresponding to "asphalt," "concrete," "gravel," "ice," and "snow" that are road surface conditions are demonstrated in the vertical direction. In addition, as road surface conditions, the friction coefficients corresponding to dry (dry (D)) and wet (wet (W)) are demonstrated in the lateral direction.

The second friction coefficient calculator 220 applies the road surface state determined from the map of FIG. 3A to the database of FIG. 4 to calculate the road surface friction coefficient $\mu_N$. At this time, with respect to the determination of "asphalt," "concrete," or "gravel," it is determined from a result obtained by determining the similarity between an image of the road surface which is acquired from the camera of the second sensor 160 and respective images of "asphalt," "concrete," and "gravel" acquired in advance whether the road surface in front of the vehicle is "asphalt," "concrete," or "gravel."

Further, in the case where it is determined that the road surface in front of the vehicle is "asphalt," the second friction coefficient calculator 220 determines from a result obtained by determining the similarity between an image of the road surface which is acquired from the camera of the second sensor 160 and respective images of "new pavement," "normal pavement," "worn pavement," and "excessive tar" acquired in advance that the road surface in front of the vehicle is "asphalt," and which of "new pavement," "normal pavement," "worn pavement," and "excessive tar" the road surface in front of the vehicle is. In the case where it is determined that the road surface in front of the vehicle is "concrete" or "gravel," the second friction coefficient calculator 220 can similarly make a further detailed determination.

As described above, the second friction coefficient calculator 220 calculates a road surface friction coefficient μf of the area in front of the vehicle from the database of FIG. 4 on the basis of the road surface condition and the vehicle velocity. For instance, in the case where it is determined from an image of the camera of the second sensor 160 that the road surface is "new pavement" of "asphalt," the vehicle velocity detected from the vehicle velocity sensor 190 or the wheel speed sensors 127 and 128 is 40 km/h, and it is determined from the map of FIG. 3 that the road surface condition is dry (dry (D)), the value of the road surface friction coefficient μf is calculated as 0.8 to 1.0.

In the present example, the first sensor 150 and the second sensor 160 are combined to cause the first sensor 150 to execute accurate braking and driving control when normally traveling. In addition, before the vehicle dashes to a low μ road (low friction road surface) from a high μ road, the low friction road surface determiner 225 determines on the basis of the road surface state estimated from the second sensor 160 whether a low friction road surface is present in front of the vehicle. Then, in the case where a low friction road surface is present in front of the vehicle, the braking and driving force controller 230 calculates a friction circle from the road surface friction coefficient μf calculated by the second sensor 160, and executes braking and driving force control to keep a slip to a minimum before dashing to a low μ road. In addition, the braking and driving force controller 230 controls the inverters 123, 124, 125, and 126 on the basis of the size of the friction circle to control the braking and driving force of the motors 108, 110, 112, and 114 that drive the vehicle 2000. The braking and driving force controller 230 controls the brake actuator 300 of the brake that brakes the vehicle 2000 on the basis of the size of the friction circle, thereby controlling the braking force.

Figure 5:
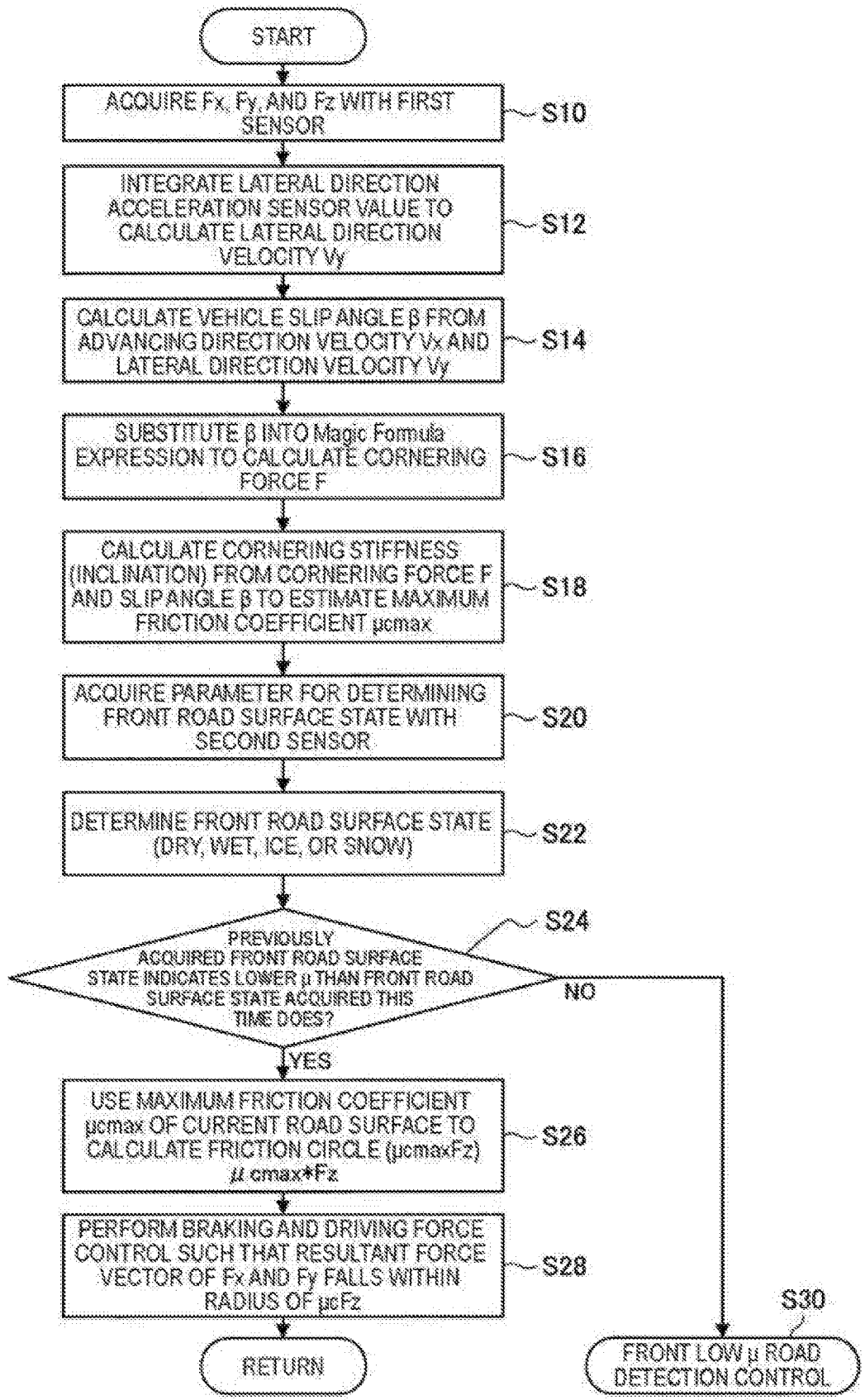
FIG. 5 is a flowchart illustrating a basic process of a vehicle system according to the present example.

FIG. 5 is a flowchart illustrating a basic process of the vehicle system 1000 according to the present example. The processes illustrated in FIG. 5 are chiefly performed by the control apparatus 200 in each predetermined control cycle (e.g., 100 per ms). First, in step S10, the first sensor 150 detects Fx, Fy, and Fz. Next, in step S12, the value of the lateral direction acceleration of the vehicle which is detected by the lateral direction acceleration sensor 195 is integrated to calculate lateral direction velocity Vy.

Next, in step S14, advancing direction velocity Vx (vehicle velocity V) and the lateral direction velocity Vy of the vehicle are used to calculate a vehicle slip angle β. The vehicle slip angle β can be calculated from the following expression.

$$\beta = \tan^{-1}(Vy/Vx)$$

Next, in step S16, cornering force F is calculated from the vehicle slip angle β. The cornering force F can be obtained by substituting the vehicle slip angle β into the following Magic Formula expression. Note that B, C, D, and E are predetermined coefficients in the following expression.

$$F = D \sin(C \tan^{-1}(B\beta - E(B\beta \tan^{-1}(B\beta))))$$

Figure 6:
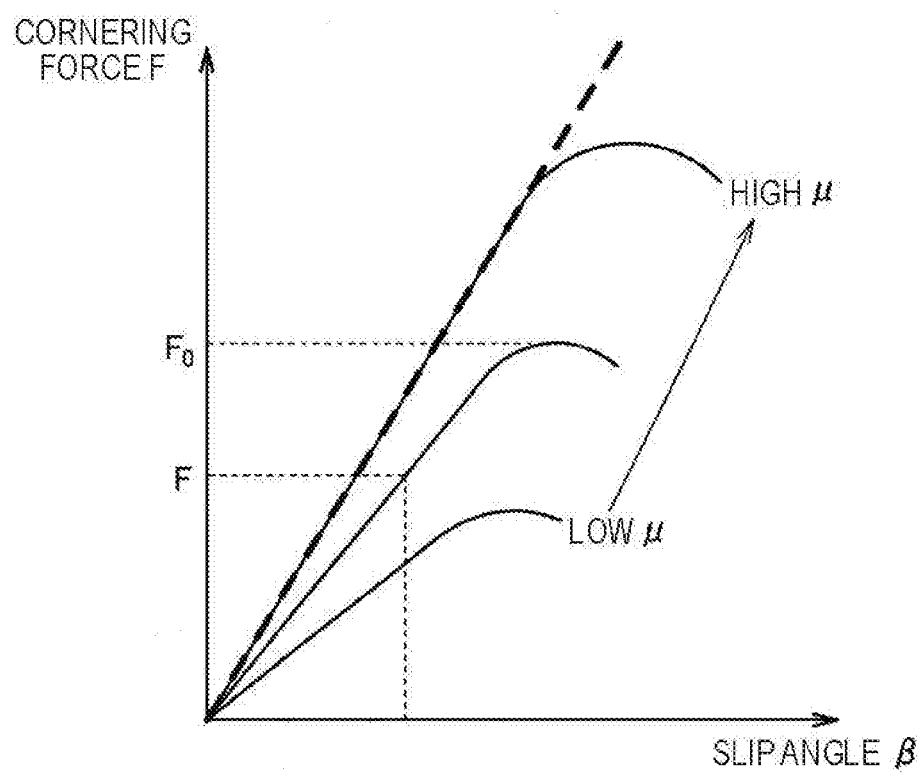
FIG. 6 is a schematic diagram illustrating cornering stiffness (inclination) decided in accordance with cornering force F and a slip angle $\beta$.

Next, in step S18, the cornering force F and the slip angle β are used to calculate cornering stiffness (inclination), and estimate a maximum friction coefficient μcmax of the road surface on which the vehicle is currently traveling. FIG. 6 is a schematic diagram illustrating the cornering stiffness (inclination) decided in accordance with the cornering force F and the slip angle β. As illustrated in FIG. 6, the method of least squares and the like are used to estimate the cornering stiffness (inclination), and estimate the maximum friction coefficient μcmax. As illustrated in FIG. 6, as the cornering stiffness (inclination) increases, the friction coefficient increases. Note that, simply speaking, the calculation expression described above may be used to obtain the road surface friction coefficient μc, and the road surface friction coefficient μc may be used instead of the maximum friction coefficient μcmax.

Next, in step S20, a parameter is acquired for the second sensor 160 to determine the road surface state of the area in front of the vehicle. Next, in step S22, the second road surface friction coefficient calculator 220 uses the determination method described in FIG. 3 to determine the road surface state of the area in front of the vehicle with the parameter acquired in the step S20.

Next, in step S24, it is determined whether the front road surface state acquired in the previous control cycle indicates lower μ than the front road surface state acquired in the current control cycle does. In the case where the front road surface state acquired in the previous control cycle indicates lower μ than the front road surface state acquired in the current control cycle does, the flow proceeds to step S26. Note that the case where the front road surface state acquired in the previous control cycle indicates lower μ than the front road surface state acquired in the current control cycle does corresponds to, for instance, the case where the front road surface state acquired in the previous control cycle is wet (WET) and the front road surface state acquired in the current control cycle is dry (DRY). The determination of step S24 is made by the low friction road surface determiner 225.

In addition, the second road surface friction coefficient calculator 220 can calculate the road surface friction coefficient μf of the area in front of the vehicle in the method described with reference to FIG. 4, and it is thus determined in step S24 whether the road surface friction coefficient μf of the front area which is acquired in the previous control cycle is smaller than the road surface friction coefficient μf acquired in the current control cycle. In the case where the road surface friction coefficient μf of the front area which is acquired in the previous control cycle is smaller than the road surface friction coefficient μf acquired in the current control cycle, the flow may proceed to step S26.

In the case where the flow proceeds to step S26, the front road surface state acquired in the previous control cycle indicates lower μ than the front road surface state acquired in the current control cycle does, and the road surface state acquired in the current control cycle indicates higher μ. Accordingly, the low friction road surface determiner 225 determines that no low friction road surface is present in front of the vehicle. Therefore, in step S26, the maximum friction coefficient μcmax of the current road surface is used to calculate a friction circle (μcmaxFz). The friction circle (μcmaxFz) can be calculated from the following expression.

$$\mu c \max Fz = \mu c \max * Fz$$

Next, in step S28, braking and driving force control is performed such that the resultant force of Fx and Fy detected from the first sensor 150 falls within the radius of the friction circle (μcmaxFz).

In contrast, in the case where the front road surface state acquired in the previous control cycle does not, in step S24, indicates lower μ than the front road surface state acquired in the current control cycle does, the flow proceeds to step S30. In the case where the flow proceeds to step S30, the front road surface state acquired in the previous control cycle indicates higher μ than the front road surface state acquired in the current control cycle does, and the road surface state acquired in the current control cycle indicates lower μ. Accordingly, a road surface of lower μ than that of the vehicle position is detected in front of the vehicle. That is, the low friction road surface determiner 225 determines that a low friction road surface is present in front of the vehicle. Thus, in this case, the flow transitions to the flow of front low μ road detection control.

Figure 7:
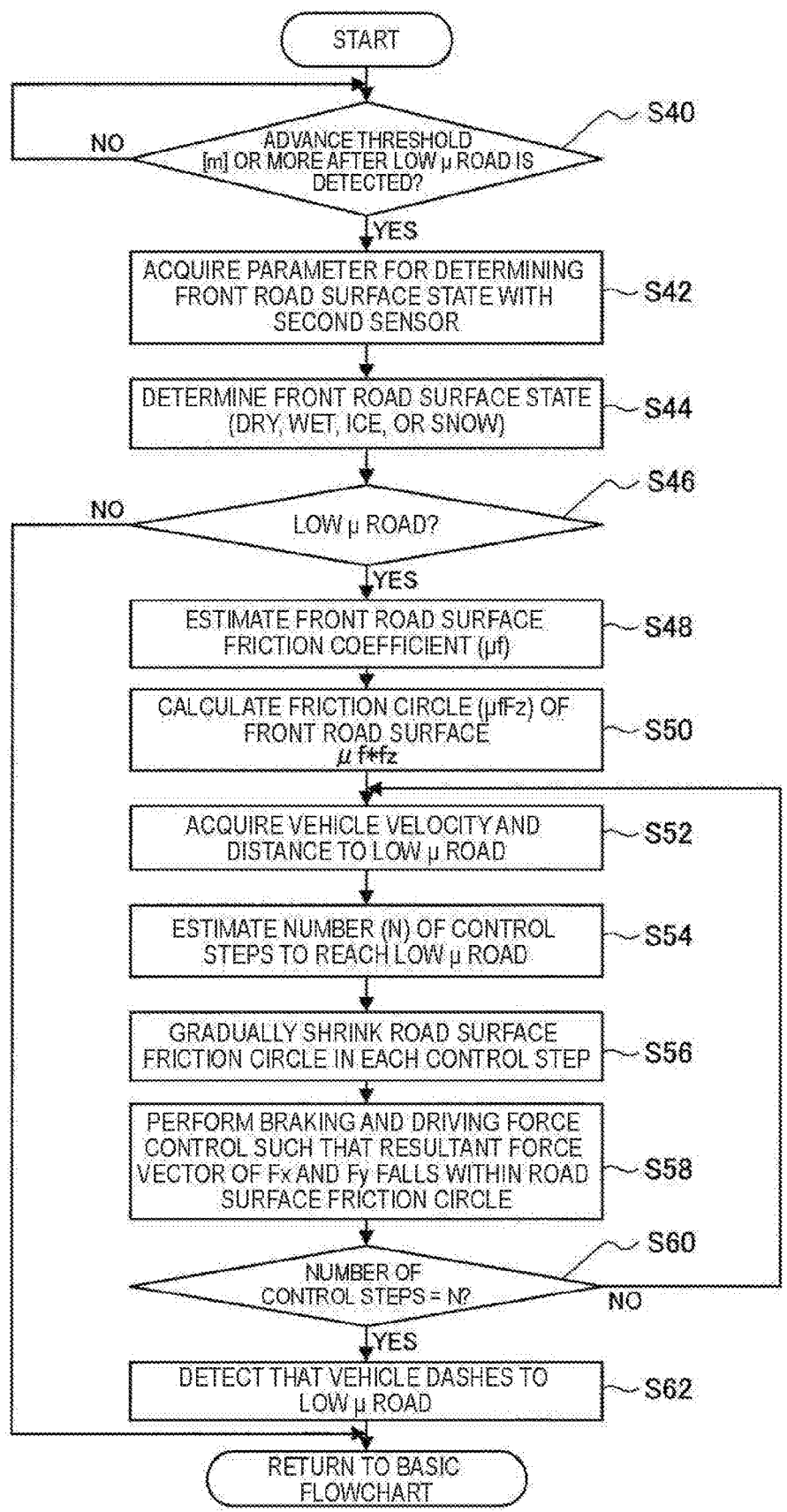
FIG. 7 is a flowchart illustrating a flow of front low $\mu$ road detection control in step S30 of FIG. 5 in detail.

FIG. 7 is a flowchart illustrating the flow of the front low μ road detection control in step S30 of FIG. 5 in detail. First, in step S40, it is determined whether the vehicle advances a distance greater than or equal to a predetermined threshold [m] after a low μ road is detected in front of the vehicle. Then, in the case where the vehicle advances the distance greater than or equal to the predetermined threshold [m] after a low μ road is detected in front of the vehicle, the flow proceeds to step S42. In contrast, in the case where the vehicle does not advance the distance greater than or equal to the predetermined threshold [m] after a low μ road is detected in front of the vehicle, the flow waits in step S40.

In step S42, a parameter is acquired for the second sensor 160 to determine the road surface state of the area in front of the vehicle. The process of step S42 is performed similarly to that of step S20 in FIG. 5. Next, in step S44, the parameter acquired in step S42 is used to determine the road surface state of the area in front of the vehicle. Next, in step S46, it is determined whether the area in front of the vehicle is a low μ road. In the case of a low μ road, the flow proceeds to the processes subsequent to step S48, and front low μ road detection control is performed. The determination of step S46 is made similarly to the determination of step S24 in FIG. 5. In contrast, in the case where the area in front of the vehicle is not, in step S46, a low μ road, the flow returns to the processes in FIG. 5.

In this way, in the case where a low μ road is first detected in step S24 of FIG. 5, and then the vehicle 2000 advances a distance greater than or equal to a predetermined threshold, it is determined again in step S46 of FIG. 7 whether the area in front of the vehicle is a low μ road. Then, in the case where it is detected again that the area in front of the vehicle is a low μ road, front low μ road detection control is performed. This can prevent front low μ road detection control from being performed, for instance, in the case where a low μ road such as a puddle is temporarily detected in front of the vehicle. In the distance of the section of the low μ road detected by the second sensor 160 is extremely short and partial, and it is more favorable to pass by without lowering the torque such as the case where the low μ road is caused by a wet manhole, it is possible to refrain from unnecessarily lowering the torque. Thus, it is possible to pass by without reducing the driving force too much when passing by a partial low μ road.

In step S48, the second friction coefficient calculator 220 estimates the road surface friction coefficient (μf) of the area in front of the vehicle. Next, in step S50, a friction circle (μfFz) of the road surface in front of the vehicle is calculated on the basis of the road surface friction coefficient (μf). The friction circle (μfFz) can be calculated from the following expression. Note that Fz can be detected from the first sensor 150.

$$\mu fFz = \mu f * Fz$$

Next, in step S52, the vehicle velocity V and the distance to the low μ road in front of the vehicle are acquired. Next, in step S54, the number (N) of control steps to reach the low μ road in front of the vehicle is estimated.

Next, in step S56, the friction circle calculated in step S50 is gradually shrunk in each control step. Next, in step S58, braking and driving force control is performed such that the resultant force of Fx and Fy falls within the radius of the friction circle.

Next, in step S60, it is determined whether the number of control steps reaches N. In the case where the number of control steps reaches N, the flow proceeds to step S62. In step S62, it is detected on the basis of a detection value of the first sensor 150 that the vehicle dashes to the low μ road. The use of a detection value of the first sensor 150 makes it possible to estimate the friction coefficient (first road surface friction coefficient) of the road surface on which the vehicle 2000 is traveling, so that braking and driving force control is performed on the basis of the first road surface friction coefficient after the vehicle dashes to the low μ road. After step S62, the flow returns to the basic flowchart of FIG. 5.

In addition, in the case where the number of control steps does not, in step S60, reach N, the flow returns to step S52, and the processes subsequent to step S52 are continued.

Figure 8:
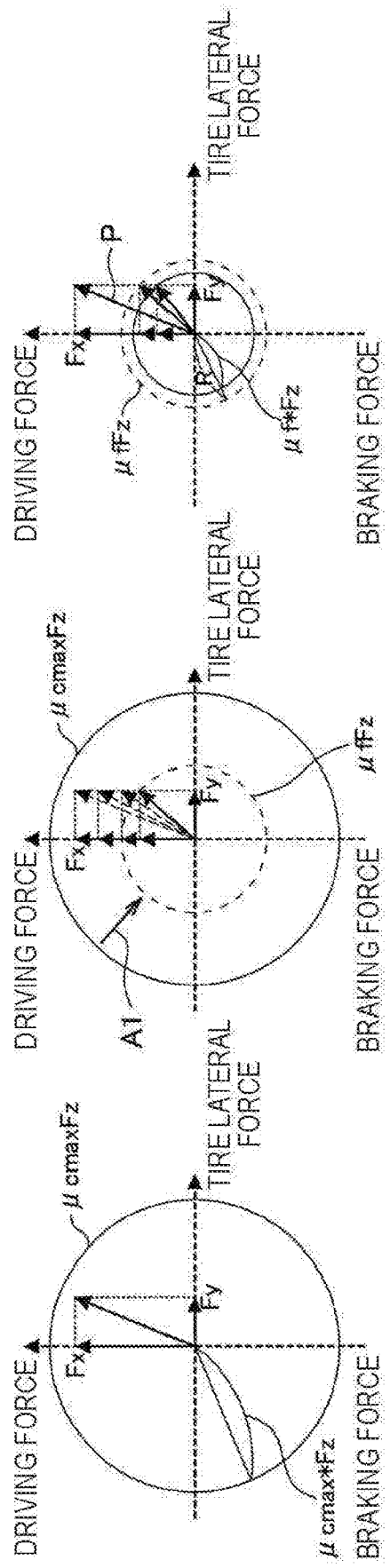
FIG. 8 is a schematic diagram illustrating braking and driving force control based on a friction circle in step S28 of FIG. 5 and step S56 of FIG. 7.

FIG. 8 is a schematic diagram illustrating the braking and driving force control based on a friction circle in step S28 of FIG. 5 and step S56 of FIG. 7. A friction circle (μcmaxFz) "when normally traveling" illustrated in FIG. 8 corresponds to the braking and driving force control of step S28, and the radius is μcmax*Fz. As illustrated in FIG. 8, when normally traveling, braking and driving force control is performed such that the resultant force of Fx and Fy falls within the range of the friction circle (μcmaxFz).

Specifically, a maximum value Fmax of Fx to prevent the vehicle from a slip is calculated from the following expression, and braking and driving force control is performed such that the braking and driving force does not exceed Fmax.

$$F \max = \sqrt{(\mu c \max^2 - Fy^2)}$$

In addition, "when detecting front low μ road" and "when dashing to low μ road" illustrated in FIG. 8 correspond to the braking and driving force control of step S56 in FIG. 7. As illustrated as "when detecting front low μ road" in FIG. 8, in the case where a front low μ road is detected, the size of the friction circle is reduced to that of the friction circle (μfFz) in each control step as illustrated with an arrow A1. Then, braking and driving force control is performed such that the resultant force of Fx and Fy falls within the range of the friction circle in the process of shrinking the friction circle in each control step. Once the number of control steps reaches N in step S60 of FIG. 7, the size of the friction circle is reduced to that of the friction circle (μfFz) represented by the dashed line for "when dashing to low μ road" illustrated in FIG. 8. When dashing to the low μ road, braking and driving force control is performed such that the resultant force of Fx and Fy falls within the range of this friction circle (μfFz).

That is, the friction circle (μfFz) is calculated on the basis of the road surface friction coefficient (μf) of the area in front of the vehicle which is estimated in step S48 of FIG. 7, and the friction circle (μcmaxFz) is gradually shrunk in step S56 to the friction circle (μfFz), thereby performing braking and driving force control such that the resultant force of Fx and Fy falls within the friction circle (μfFz) before dashing to the low μ road. The friction circle represented by the solid line for "when dashing to low μ road" illustrated in FIG. 8 represents the actual resultant force of Fx and Fy for which braking and driving force control is performed.

In this way, by shrinking the friction circle from the time at which a front low μ road is detected, the size of the friction circle (μfFz) is reduced to that of the friction circle represented by the dashed line for "when dashing to low μ road" illustrated in FIG. 8 at the time at which the vehicle dashes to the low μ road. Thus, it is possible to prevent a slip from occurring when the vehicle dashes to the low μ road, and surely stabilize the vehicle behavior. Even if the road surface friction coefficient μc acquired on the basis of the first sensor 150 when dashing to the low μ road is smaller than the road surface friction coefficient μf acquired on the basis of the second sensor 160, it is possible to perform braking and driving force control with a slip prevented.

As described above, a low μ road is sensed in front of the vehicle on the basis of the detection of the second sensor 160, and then the diameter of a friction circle is gradually reduced before dashing to the low μ road. The torque is lowered in accordance with the diameter of the friction circle, which gradually limits the torque. Performing braking and driving force control not after the road surface on which the vehicle 2000 is actually traveling becomes a low μ road, but before the vehicle 2000 dashes to a low μ road makes it possible to reduce sudden acceleration and deceleration, and surely stabilize the vehicle behavior when dashing to the low μ road. In addition, in the case where it is necessary to brake the vehicle 2000 after dashing to a low μ road, the torque is lowered before dashing to the low μ road. Therefore, it is possible to reduce the braking distance. In addition, it is possible to execute braking and driving control within the range within which a friction circle is not considerably exceeded, so that the driving stability of the vehicle 2000 can be secured.

Meanwhile, in the case where the process of step S56 is not executed, as illustrated as a resultant force vector P for "when dashing to low μ road" illustrated in FIG. 8, the resultant force vector P deviates from a friction circle. Therefore, the vehicle can slip and make the vehicle behavior unstable.

Figure 9:
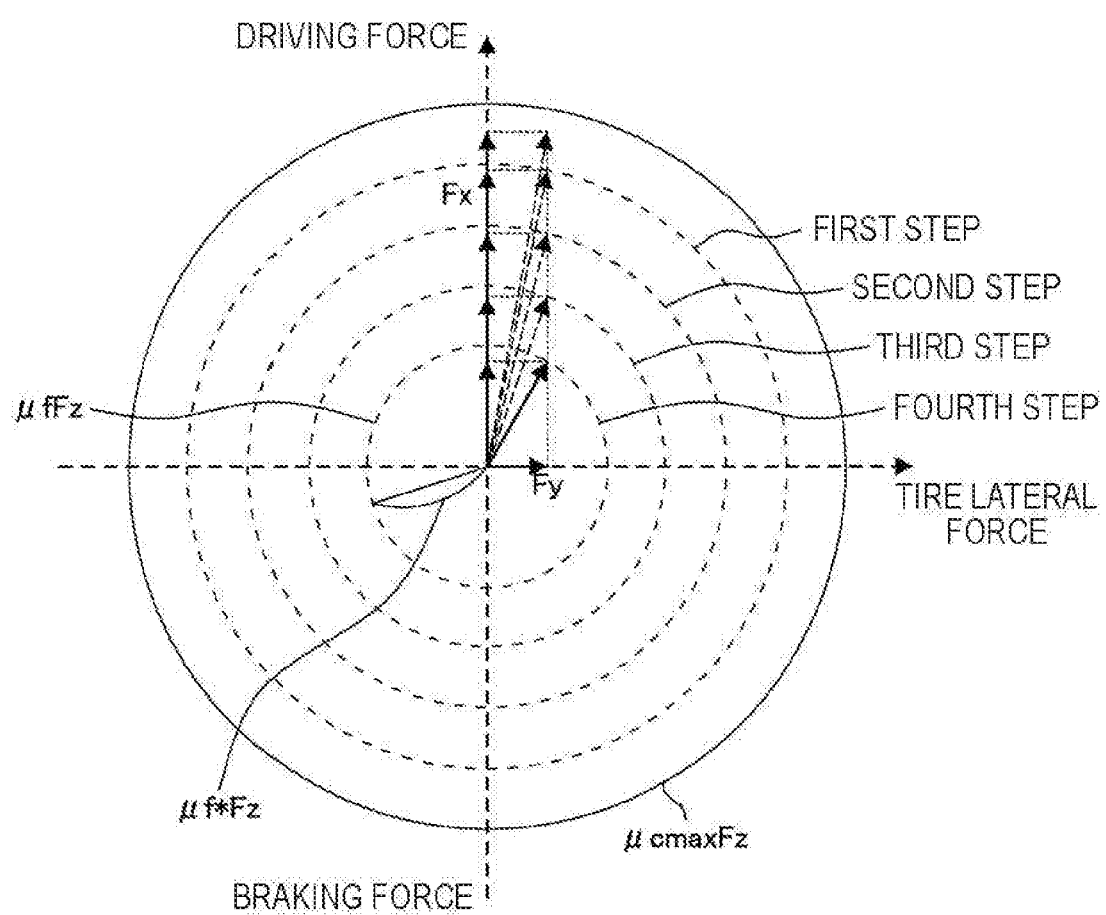
FIG. 9 is a schematic diagram illustrating a process of step S56 in FIG. 7 in detail.

FIG. 9 is a schematic diagram illustrating the process of step S56 in FIG. 7 in detail. Here, an instance will be described in which a low μ road is detected at the position 6 m ahead of the vehicle while the vehicle is traveling at 54 km an hour. If the control cycle is set at 100 ms, the distance travelled by the vehicle in each control cycle is 1.5 m. Accordingly, the number of control steps necessary before reaching the low μ road after the low μ road is detected is "4."

In step S56 of FIG. 7, as illustrated in FIG. 9, the radius of the road surface friction coefficient is reduced in each step such that the road surface friction coefficient has a radius of μf×Fz in the fourth control step, and the torque is lowered such that the driving force falls within the radius of the road surface friction coefficient.

As the control cycles become shorter, and the front detection distance of the second sensor 160 becomes longer, the number of steps to reduce the diameter of a friction circle becomes larger and it is possible to execute fine torque-down control.

Next, a technique of compensating the lowered total driving force of the vehicle with the driving force of the rear wheels 104 and 106 in the case where the torque of the driving force of the front wheels 100 and 102 is lowered with the technique described above will be described. FIG. 10 illustrates that, when normally traveling, braking and driving force control is performed on the resultant force of Fx and Fy with respect to the front wheels 100 and 102 and the rear wheels 104 and 106 within the range of a friction circle (μcmaxFz).

Figure 11:
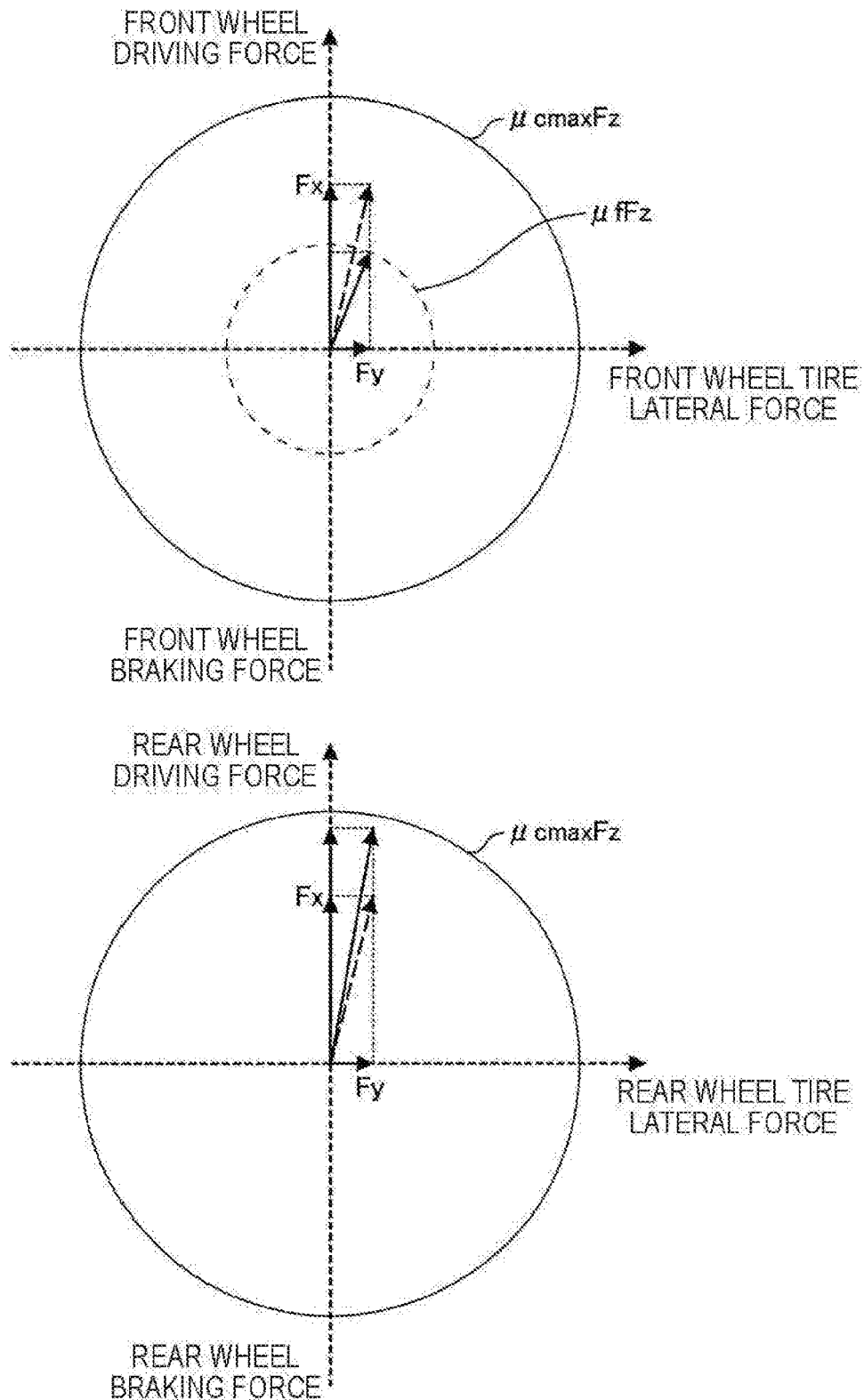
FIG. 11 is a schematic diagram illustrating braking and driving force control performed on a front wheel and a rear wheel in a case where a low $\mu$ road is detected in front of a vehicle.

FIG. 11 is a schematic diagram illustrating braking and driving force control on the front wheels 100 and 102 and the rear wheels 104 and 106 which is performed in the case where a low μ road is detected in front of the vehicle. When a low μ road is detected in front of the vehicle in the state illustrated in FIG. 10, the driving force of the front wheels 100 and 102 is controlled with the technique described above such that the resultant force of Fx and Fy falls within the range of a friction circle (μfFz). That is, the torque of the front wheels 100 and 102 is lowered such that the resultant force of Fx and Fy falls within the range of a friction circle (μfFz). That is, the torque is lowered such that the resultant force of Fx and Fy becomes the resultant force represented by the solid line from the resultant force represented by the dashed line.

Meanwhile, the torque of the rear wheels 104 and 106 is raised such that the resultant force of Fx and Fy becomes the resultant force represented by the solid line from the resultant force represented by the dashed line. Specifically, with respect to the rear wheels 104 and 106, the driving force of the front wheels 100 and 102 whose torque is lowered is imparted within the range within which the resultant force falls within the friction circle (μcmaxFz), thereby making it possible to execute torque control without reducing the total driving force of the entire vehicle. The control described above gradually lowers the torque of the front wheels 100 and 102 before dashing to a low μ road. Accordingly, the torque of the rear wheels 104 and 106 is also raised gradually. Thus, it is possible to prevent the vehicle 2000 from being excessively decelerated before the vehicle 2000 reaches a low μ road, and prevent an occupant of the vehicle 2000 as far as possible from sensing the torque lowered. Meanwhile, it is also desirable to lower the torque of the rear wheels 104 and 106 immediately before the vehicle 2000 reaches a low μ road. This makes it possible to stabilize the vehicle behavior when the vehicle 2000 dashes to a low μ road.

In this way, a low μ road is sensed by the second sensor 160 in front of the vehicle, the torque of the front wheels 100 and 102 is then lowered before dashing to the low μ road, and the lowered torque of the front wheels 100 and 102 is distributed to the driving force of the rear wheels within the range within which the resultant force falls within the diameter of a friction circle, thereby making it possible to maintain the total driving force. This makes it possible to dash to a low μ road such that the front wheels 100 and 102 are prevented from a slip, and prevent the total driving force from decreasing. Distributing the reduced driving force of the front wheel side to the driving force of the rear wheels makes it possible to refrain from unnecessarily reducing the driving force and safely dash to a low μ road.

According to the present example as described above, braking and driving force is controlled at the normal time on the basis of a first road surface friction coefficient estimated from a detection value of the first sensor 150, and braking and driving force is controlled on the basis of a second road surface friction coefficient in the case where a low friction road surface is present in front of the vehicle. Therefore, it is possible to stabilize the vehicle behavior when the vehicle dashes to a low friction road surface. That is, it is possible to optimally control the vehicle on the basis of the road surface on which the vehicle is traveling and the second road surface friction coefficient that is the friction coefficient of the road surface in front of the vehicle.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A control apparatus for a vehicle, the control apparatus comprising:
a processor configured to:
calculate a first road surface friction coefficient that is a friction coefficient of a road surface in a contact with a wheel;
calculate a second road surface friction coefficient on a basis of a detection value from a contactless sensor capable of contactlessly detecting a road surface state;
control a braking and driving force of the vehicle on a basis of the first road surface friction coefficient at a normal time, and control the braking and driving force of the vehicle on a basis of the second road surface friction coefficient in a case where it is determined on the basis of the second road surface friction coefficient that a low friction road surface having a low friction coefficient is present in front of the vehicle;
calculate the second road surface friction coefficient in each predetermined control cycle, including:
calculating a previous second road surface friction coefficient from a previous control cycle; and
calculating a current second road surface friction coefficient from a current control cycle, wherein the previous control cycle immediately precedes the current control cycle;
compare the previous second road surface friction coefficient with the current second road surface friction coefficient; and
determine that the low friction road surface is present in front of the vehicle when the current second road surface friction coefficient is less than the previous second road surface friction coefficient.

2. The control apparatus for a vehicle according to claim 1, wherein the processor is configured to:
control the braking and driving force within a range of a friction circle decided in accordance with the first road surface friction coefficient at the normal time, and
control the braking and driving force within the range of the friction circle while shrinking the friction circle before the vehicle reaches the low friction road surface in the case where it is determined that the low friction road surface is present in front of the vehicle.

3. The control apparatus for a vehicle according to claim 2, wherein the processor is configured to reduce a size of the friction circle from a size corresponding to the first road surface friction coefficient to a size corresponding to the second road surface friction coefficient before the vehicle reaches the low friction road surface.

4. The control apparatus for a vehicle according to claim 2, wherein the processor is configured to:
determine whether the low friction road surface is present in front of the vehicle,
calculate the second road surface friction coefficient in each predetermined control cycle, and
determine that the low friction road surface is present in front of the vehicle in a case where a value of the second road surface friction coefficient is smaller in a current control cycle than in a previous control cycle.

5. The control apparatus for a vehicle according to claim 3, wherein the processor is configured to:
determine whether the low friction road surface is present in front of the vehicle,
calculate the second road surface friction coefficient in each predetermined control cycle, and
determine that the low friction road surface is present in front of the vehicle in a case where a value of the second road surface friction coefficient is smaller in a current control cycle than in a previous control cycle.

6. The control apparatus for a vehicle according to claim 1, wherein
the processor is configured to control the braking and driving force of the vehicle on a basis of the second road surface friction coefficient in a case where it is determined at least twice that the low friction road surface is present while the vehicle is traveling a predetermined distance.

7. The control apparatus for a vehicle according to claim 4, wherein
the processor is configured to control the braking and driving force of the vehicle on a basis of the second road surface friction coefficient in a case where it is determined at least twice that the low friction road surface is present while the vehicle is traveling a predetermined distance.

8. The control apparatus for a vehicle according to claim 5, wherein
the processor is configured to control the braking and driving force of the vehicle on a basis of the second road surface friction coefficient in a case where it is determined at least twice that the low friction road surface is present while the vehicle is traveling a predetermined distance.

9. The control apparatus for a vehicle according to claim 1, wherein
the processor is configured to lower a torque of a driving force of a front wheel and raise a toque of a rear wheel on a basis of the second road surface friction coefficient in a case where it is determined that the low friction road surface is present in front of the vehicle.

10. The control apparatus for a vehicle according to claim 1, wherein
the processor is configured to calculate the first road surface friction coefficient on a basis of a detection value from a hub unit sensor provided to an axle.

11. The control apparatus for a vehicle according to claim 2, wherein the processor is configured to calculate the first road surface friction coefficient on a basis of a detection value from a hub unit sensor provided to an axle.

12. The control apparatus for a vehicle according to claim 3, wherein
the processor is configured to calculate the first road surface friction coefficient on a basis of a detection value from a hub unit sensor provided to an axle.

13. The control apparatus for a vehicle according to claim 1, wherein
the processor is configured to calculate the first road surface friction coefficient on a basis of a detection value from a hub unit sensor provided to an axle.

14. The control apparatus for a vehicle according to claim 4, wherein
the processor is configured to calculate the first road surface friction coefficient on a basis of a detection value from a hub unit sensor provided to an axle.

15. The control apparatus for a vehicle according to claim 5, wherein
the processor is configured to calculate the first road surface friction coefficient on a basis of a detection value from a hub unit sensor provided to an axle.

16. A control method for a vehicle, the control method comprising:
calculating a first road surface friction coefficient that is a friction coefficient of a road surface in a contact with a wheel;
calculating a second road surface friction coefficient on a basis of a detection value from a contactless sensor capable of contactlessly detecting a road surface state; and
controlling a braking and driving force of the vehicle on a basis of the first road surface friction coefficient at a normal time, and controlling the braking and driving force of the vehicle on a basis of the second road surface friction coefficient in a case where it is determined on the basis of the second road surface friction coefficient that a low friction road surface having a low friction coefficient is present in front of the vehicle,
calculating the second road surface friction coefficient in each predetermined control cycle, including:
calculating a previous second road surface friction coefficient from a previous control cycle; and
calculating a current second road surface friction coefficient from a current control cycle, wherein the previous control cycle immediately precedes the current control cycle;
comparing the previous second road surface friction coefficient with the current second road surface friction coefficient; and
determining that the low friction road surface is present in front of the vehicle when the current second road surface friction coefficient is less than the previous second road surface friction coefficient.

17. A control apparatus for a vehicle, the control apparatus comprising:
circuitry configured to
calculate a first road surface friction coefficient that is a friction coefficient of a road surface in a contact with a wheel,
calculate a second road surface friction coefficient on a basis of a detection value from a contactless sensor capable of contactlessly detecting a road surface state, and
control a braking and driving force of the vehicle on a basis of the first road surface friction coefficient at a normal time, and control the braking and driving force of the vehicle on a basis of the second road surface friction coefficient in a case where it is determined on the basis of the second road surface friction coefficient that a low friction road surface having a low friction coefficient is present in front of the vehicle,
calculate the second road surface friction coefficient in each predetermined control cycle, including:
calculating a previous second road surface friction coefficient from a previous control cycle; and
calculating a current second road surface friction coefficient from a current control cycle, wherein the previous control cycle immediately precedes the current control cycle;
compare the previous second road surface friction coefficient with the current second road surface friction coefficient; and
determine that the low friction road surface is present in front of the vehicle when the current second road surface friction coefficient is less than the previous second road surface friction coefficient.

* * * * *